April 11, 1967 J. J. LOVINGHAM 3,313,488
ROCKET THRUST CHAMBER
Filed Oct. 2, 1964 2 Sheets-Sheet 1

INVENTOR.
JOSEPH J. LOVINGHAM
BY
HIS AGENT

April 11, 1967 J. J. LOVINGHAM 3,313,488
ROCKET THRUST CHAMBER
Filed Oct. 2, 1964 2 Sheets-Sheet 2
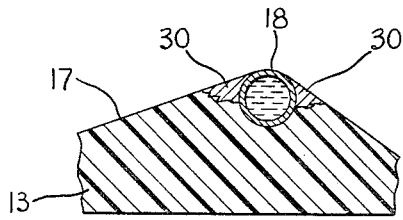
Fig. 2
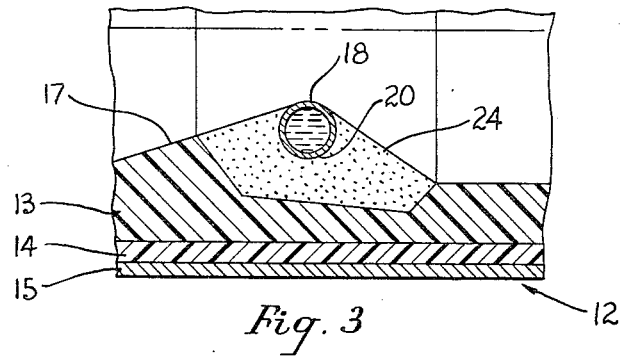
Fig. 3
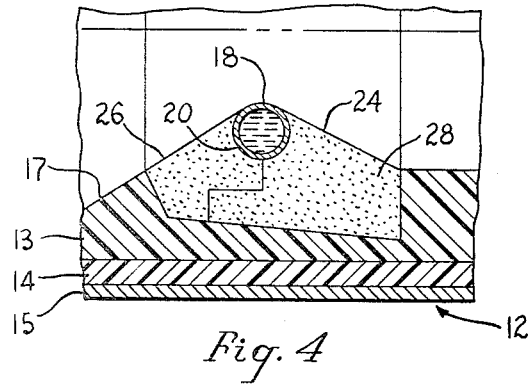
Fig. 4
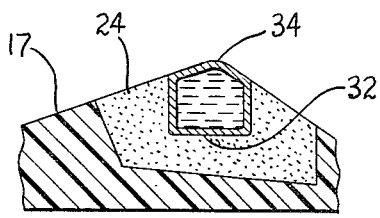
Fig. 5
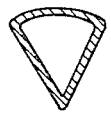  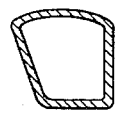 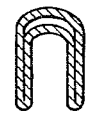
Fig. 6   Fig. 7   Fig. 8   Fig. 9
INVENTOR.
JOSEPH J. LOVINGHAM
BY
*William R. Wright*
HIS AGENT

United States Patent Office 3,313,488
Patented Apr. 11, 1967

3,313,488
ROCKET THRUST CHAMBER
Joseph J. Lovingham, Madison, N.J., assignor to Thiokol Chemical Corporation, Bristol, Pa., a corporation of Delaware
Filed Oct. 2, 1964, Ser. No. 401,026
7 Claims. (Cl. 239—127.1)

This invention relates generally to rocket motors and more particularly to an improved rocket thrust chamber and nozzle construction which is free from nozzle throat degradation throughout long duration operation.

As is well known, rocket motor operation involves very high temperatures which damage and erode the thrust chamber and nozzle and particularly the throat area of the latter. As a result, it is customary to provide: a liquid coolant which may be one of the propellants, to regeneratively cool the motor; a heat sink to absorb a portion of the heat; or an ablative surface which is predesigned to erode at a certain rate which enables rocket operation over a desired, predetermined period.

The difficulty of providing adequate cooling, etc. to prevent erosion or degradation of the nozzle throat area becomes increasingly more difficult as technology develops improved propellants of increasingly greater combustion temperatures. Where regenerative cooling is employed, a coolant which first cools the thrust chamber is too hot to effectively cool the nozzle throat and—vice versa.

Moreover, the use of ablative materials in thrust chamber design has heretofore been limited to applications in which is change in the throat area of the motor is acceptable. Heat sink type throat inserts such as tungsten or graphite have been proposed as an alternative to throat erosion or degradation. Unfortunately, the operational applications in which the heat sink can be used have been of limited duration since the firing time was limited by the heat capacity and the thermal diffusivity of the insert material as well as by the material melting point limitations.

Accordingly, the main object of the present invention is to provide a rocket motor design in which the throat construction is such as to enable the performance of long-duration missions without the introduction of throat degradation and without the complexity and pressure drop penalties inherent in a liquid propellant regeneratively cooled thrust chamber in addition to the inherent nozzle cooling difficulties of the regeneratively cooled motor.

An important object of the present invention is to provide a non-eroding throat for use within in ablative thrust chamber so as to enable an unrestricted firing duration thereof.

Another important object of the present invention is to provide a substantially non-degradable throat construction for a rocket motor which effects cooling of the areas adjacent to the throat to eliminate or minimize the degrading thereof.

A further important object of the present invention is to provide a novel, cooled throat construction for a rocket motor which is compatible with ablative fabrication techniques and which utilizes the limited cooling capabilities of an available propellant for cooling the throat region by restricting the bulk coolant temperature rise and the surface area exposed to the rocket motor combustion gases.

Other objects and advantages of the present invention will become apparent during the course of the following description.

In the drawings I have shown several embodiments of the invention. In these showings:

FIGURE 2 is a fragmentary, longitudinal sectional view thereof;

FIGURE 3 is a similar view showing a modified form of the invention;

FIGURE 4 is a similar view showing a further modified form of the invention;

FIGURE 5 is a similar view of a still further modified form of the invention; and FIGURES 6, 7, 8 and 9 show various coolant coil cross-sectional shapes which may be employed.

Figure 1:
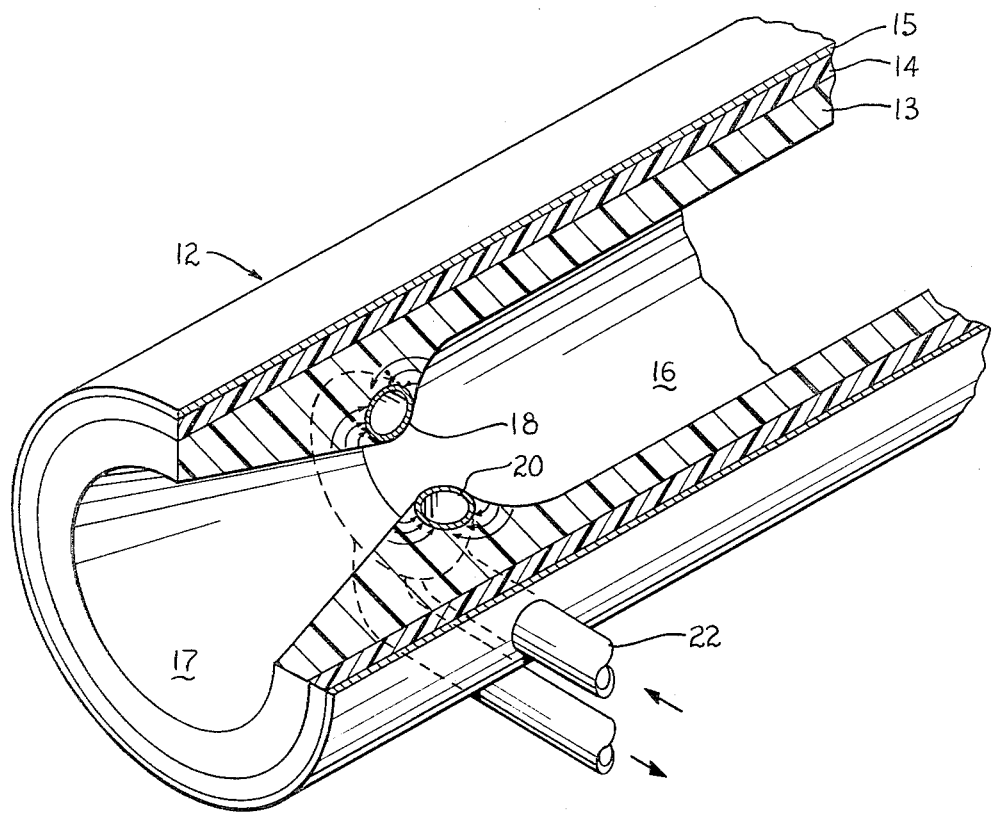
FIGURE 1 is a fragmentary, cut-away perspective view showing the construction of the novel rocket motor comprising the present invention.

Referring to the drawings, numeral 12 designates the rocket motor as a whole which comprises an ablative inner liner 13 surrounded by insulation material 14 and a structural shell or casing 15, all defining a thrust chamber 16 and an exhaust nozzle 17 including a throat 18.

The throat section 18—the small region immediately upstream and downstream of the true throat plane—is provided with a hollow tube 20 encircling the throat and having its inner edge surface exposed to the combustion gases. A coolant is passed throughout the tube 20 which is fabricated of metal, a preferred material being nickel or stainless steel although other materials with higher melting points may be desirable for specific applications.

The coolant tube 20 is inserted or embedded within the ablative material 13 either prior to assembly of the ablative material or after fabrication. The ablative material can actually cover the tube entirely provided that sufficient cooling is available from the coolant tube to keep the ablative below the decomposing temperature. Ablative materials are well known in the art and may be of the silica-phenolic, graphite-phenolic or carbon-phenolic families, or the phenolic resin types disclosed by Bluck Patent No. 3,142,960, dated Aug. 4, 1964. The rate of ablation of these materials is a function of operating temperature and pressure and the probable performance of a rocket motor using them is indicated to the engineer by the respective charts currently available with respect thereto. One of the liquid propellants of the rocket motor 12 is passed through the coolant tube 20 by a conduit 22 and peripherally about the throat 18 at a selected velocity suitable to maintain the gas-side surface temperature of the tube at a value less than its operating thermal limit and suitable to provide adequate liquid-side coolant conditions.

Thus, any exposed surface of the tube 20 will be maintained intact as long as coolant flow is maintained. The area of the material in which the coolant tube 20 is embedded will be locally cooled by conduction of heat as shown by the arrows in FIGURE 1, from the gas-side surfaces through the material and into the coolant tube. This effect can be abetted by the inclusion of particles or whiskers of good heat-conducting material, such as copper or tungsten, which will allow the heat to be conducted to tube 20 more readily. The heat removed from this adjacent area of material will maintain it at degradation preventing temperatures.

The material adjacent the coolant tube 20 may be ablative as shown in FIGURE 1 or it may be fabricated from a more highly conductive material 24 as shown in FIGURES 3 and 4 in order to provide lower gas-side operating temperatures in the throat area. FIGURE 4 differs from FIGURE 3 in that the conductive material is such that it must be fabricated in a multi-piece assembly as indicated at 26, 28, be assembled about the coolant tube 20, and this subassembly then fabricated into the rocket motor assembly.

It will be appreciated that the use of the encircling coolant tube 20, a portion of which is exposed at the throat 18, provides the most efficient pressure drop system.

However, this structural arrangement provides sharp boundaries between the coolant tube and the adjacent material which is undesirable as illustrated in FIGURE 2.

Such cusps 30, formed by the adjacent material 13 or 24, are weak structurally and highly undesirable thermally.

An alternative structural arrangement is shown in FIGURE 5 in which the cusps are eliminated by using a coolant coil 32 whose cross-sectional shape provides an inner combustion-gas-exposed face 34 defining the throat area of the exhaust nozzle. The insert or coil 32 may be embedded in ablative material 13 or in the material 24 as earlier described. FIGURE 6 to 9 inclusive show additional types of coolant coil cross-sectional shapes.

The selection of the best design configuration of nozzle throat for a given application is, of course, dependent upon the properties of the propellants, the available pressure drop, and the combustion gas characteristics. Coolant velocities and turbulence promoters may also be used within the coolant tubes as illustrated in FIGURE 9.

It will now be apparent that the present invention enables the performance of long-duration missions without the introduction of throat degradation and without the complexity and pressure drop penalties inherent in a regeneratively cooled thrust chamber.

It is to be understood that the forms of my invention herewith shown and described are to be taken as preferred examples of the same and that various changes in the size, shape and arrangement of parts may be resorted to without departure from the spirit of the invention or the scope of the subjoined claims.

I claim:

1. A rocket motor comprising, in combination, an outer casing defining a thrust chamber and exhaust nozzle including a throat, an inner insulating casing mounted against said outer casing, an ablative liner covering the inner surface of said insulating casing at least in the convergent-divergent section of the nozzle, cooling means comprising a single encircling coolant coil mounted in said ablative liner in said section of said nozzle and defining said throat, the inner face of said coil being exposed to the combustion gases of the motor, and means for supplying sufficient coolant to said coil for preventing degradation of said ablative liner.

2. The combination recited in claim 1 wherein said exposed coil face also defines the nozzle configuration adjacent said throat.

3. The combination recited in claim 1 wherein an insert formed of more conductive material than said ablative liner is mounted in the throat area of the latter and surrounds said coil except for said exposed face.

4. The combination recited in claim 3 wherein said insert is a multi-piece assembly of parts complementary to each other and said coil.

5. The combination recited in claim 3 wherein said exposed coil face also defines the nozzle configuration adjacent said throat.

6. The combination recited in claim 3 wherein said coolant coil is circular in cross-section.

7. The combination recited in claim 1 wherein said coolant coil is circular in cross-section.

References Cited by the Examiner

UNITED STATES PATENTS

| | | | |
|---|---|---|---|
| 2,395,403 | 2/1946 | Goddard | 60—35.6 |
| 2,406,926 | 9/1946 | Summerfield | 60—35.6 |
| 2,658,332 | 11/1953 | Nicholson | 60—35.6 |
| 2,835,107 | 5/1958 | Ward | 60—35.6 |
| 2,849,860 | 9/1958 | Lowe | 60—35.6 |
| 2,987,880 | 6/1961 | Kimmel | 60—35.6 |
| 3,099,909 | 8/1963 | Newcomb | 60—39.66 X |
| 3,142,960 | 8/1964 | Bluck | 60—35.6 |
| 3,156,091 | 11/1964 | Kraus | 60—35.6 |

FOREIGN PATENTS

| | | |
|---|---|---|
| 578,263 | 6/1946 | Great Britain. |

OTHER REFERENCES

Astrolite, H. I. Thompson Fiber Glass Company, Products Bulletin No. PB 7–24A, July 1959, pages 1 and 4 relied on.

CARLTON R. CROYLE, *Primary Examiner.*

MARK NEWMAN, *Examiner.*